Aug. 19, 1958  J. E. PARKER, SR  2,848,279
SELF-LOCKING WHEEL ASSEMBLY
Filed Oct. 17, 1955

James E. Parker, Sr.
INVENTOR.

BY

United States Patent Office
2,848,279
Patented Aug. 19, 1958

2,848,279

SELF-LOCKING WHEEL ASSEMBLY

James E. Parker, Sr., Warwick, R. I.

Application October 17, 1955, Serial No. 540,800

1 Claim. (Cl. 301—63)

This invention relates in general to new and useful improvements in vehicle wheels, and more specifically to an improved self-locking wheel assembly.

While the present type of wheel utilized is a rim assembly which coacts with a tire in such a manner so as to prevent the accidental disengagement of the tire from the wheel, in order to obtain the proper relationship between the tire and the rim portion of the wheel, it is necessary that the tire be so proportioned to be deformed over the rim. This makes the changing of the tire a diffcult and undesirable task.

It is therefore the primary object of this invention to provide an improved wheel assembly which is formed in two halves whereby one half may be selectively removed from the other half to permit the removal and replacement of a tire, once one of the halves has been separated from the other half, the tire may be readily pushed off of the remaining half of the wheel for repairs or replacement as deemed necessary.

Another object of this invention is to provide a two-piece wheel assembly which permits the ready separation of the wheel assembly, there being provided an extremely simple connection between the two pieces of the wheel assembly whereby the two pieces may be readily locked together with a minimum of effort.

Another object of this invention is to provide an improved sectional wheel assembly to facilitate the mounting and removal of tires, the wheel assembly being held together by heavy fasteners passed through slots in one of the sections of the wheel assembly, the pieces of the wheel assembly being prevented from rotating relative to each other by an interlocking between the rim portions of the wheel assembly and the tire.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
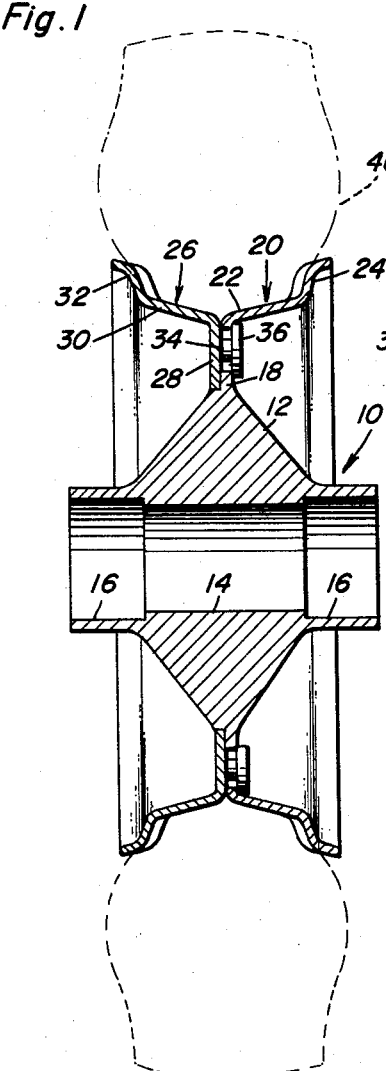
Figure 1 is a transverse vertical sectional view through a preferred form of wheel assembly embodying the spirit of this invention and shows the general details thereof, the relationship of a tire normally carried by the wheel assembly with respect to the wheel assembly being shown by dotted lines.
Figure 2:
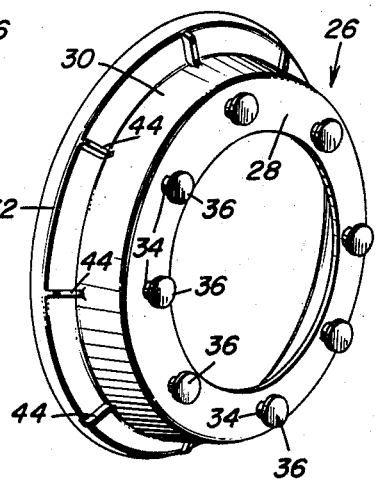
Figure 2 is a perspective view of one half of the wheel assembly and shows the specific details thereof.
Figure 3:
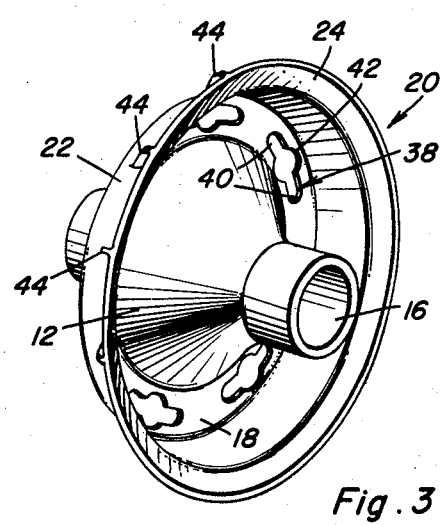
Figure 3 is a perspective view of the other half of the wheel assembly and shows the specific details thereof.
Figure 4:
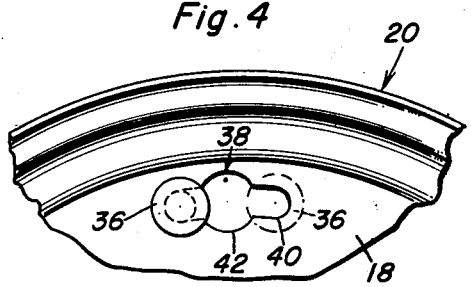
Figure 4 is a fragmentary elevational view of the wheel assembly and shows the specific relationship between one of the headed fasteners carried by one of the halves of the wheel assembly with respect to a slot formed in the other half of the wheel assembly.

Referring now to the drawings in detail, it will be seen that there is illustrated in Figure 1 a wheel assembly which is the subject of this invention, the wheel assembly being referred to in general by the reference numeral 10. The wheel assembly 10 is of the type wherein the hub is formed integral with the wheel assembly. Accordingly, the wheel assembly 10 includes a central hub portion 12 which has a transverse bore 14 extending therethrough. The ends of the bore 14 are enlarged as at 16 to receive suitable bearings.

The hub 12 terminates in an annular flange 18 which may be considered a portion of the wheel assembly half proper, the wheel assembly half being referred to by the reference numeral 20. The wheel assembly half 20 also includes a base portion 22 and a rim flange portion 24.

The wheel assembly 10 also includes a wheel assembly half which is referred to in general by the reference numeral 26. The half 26 is similar to the half 20 with the exception of the hub 12 and includes an annular flange 28 which matches the annular flange 18. The half 26 also includes a base portion 30 and a rim flange portion 32.

In order that the wheel assembly halves 20 and 26 may be releasably connected together with the flanges 18 and 28 thereof in face to face engagement, that face of the flange 28 which normally abuts a face of the flange 18 is provided with a plurality of projecting, circumferentially spaced studs 34 whose lengths are substantially equal to the thickness of the annular flange 18. Each of the studs 34 is provided with an enlarged head 36.

For each of the studs 34 carried by the flange 28, there is formed in the flange 18 an elongated slot which is referred to in general by the reference numeral 38. Each slot 38 includes a pair of end portions 40 of a width substantially equal to the diameter of the stud 34. Disposed intermediate the end portions 40 is a wide central portion 42 of a size to receive a head 36.

When it is desired to assemble the wheel assembly halves 20 and 26, the heads 36 of the studs 34 are passed through the enlarged central portions 42 of the slots 38. Then by rotating the halves 20 and 26 relative to each other, the studs 34 are moved into one of the end portions 40, depending upon the direction of rotation between the halves 20 and 26. Inasmuch as the diameter of the heads 36 is larger than the width of the end portion 40, the heads 36 will be prevented from pulling out through the end portions 40 and accordingly the halves 20 and 26 are locked to each other.

In order to prevent rotation of the halves 20 and 26 relative to each other except when desired, there is carried by the inner surfaces of the rim flange portions 24 and 32 inwardly projecting ribs or lugs 44. These ribs or lugs 44 are engageable with the beads of a tire, such as the tire 46 for which the assembly is intended. The ribs 44 interlock with the beads of the tire 46 and the tire 46 prevents relative rotation between the halves 20 and 26 to prevent accidental unlocking of the two. However, when the tire 46 is deflated, the halves 20 and 26 may be easily turned with respect to each other to separate them. At that time the tire 46 may be easily removed and replaced.

Although there has been specifically illustrated lugs or ribs 44 for the purpose of interlocking with the beads of the tire 46, it is to be understood that this form of interlock is only an example of the type of interlock which may be provided. If desired, any type of rib or projection may be formed on the rim flange portions 24 and 32. Further, if desired, suitable projections could be formed on the beads of the tire 46 and matching depressions formed in the rim flange portions 24 and 32.

It is pointed out at this time that the hub 12 need not be of the type illustrated nor need it be formed as part of one of the halves of the wheel assembly 10. If desired, the wheel assembly 10 may be of the removable type normally found on automobiles and one of the flanges, either the flange 18 or the flange 28 will be provided with a suitable bolt hole pattern to receive the lug bolts of a vehicle wheel drum. In such event, the particular flange provided with the lug hole pattern will extend further towards the center of the wheel assembly 10. On the other hand, if desired, the lug bolt hole pattern could be formed in both flanges and the lug bolts of the drum may serve as the means for preventing relative rotation between the wheel sections. However, this latter form would be the least preferred inasmuch as this would necessitate the removal of the wheel assembly from the drum prior to the removal of the tire. By placing the lug hole in the flange of one of the halves, preferably the inner half, the other half may be removed without removing the wheel assembly from its drum so that the tire could be changed leaving half of the wheel assembly on the vehicle.

The forgoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A separable self-locking wheel assembly comprising first and second wheel sections, each of said wheel sections including a tire retaining rim flange portion and a connecting flange, a hub immovably fixed to said connecting flange of one of said sections, said connecting flanges being disposed in face to face engagement, headed stud members on one of said connecting flanges, aligned slots in the other of said connecting flanges receiving said stud members, heads of said studs engaging a remote surface of said other connecting flange, said slots having enlarged portions receiving said heads, and means on said tire retaining rim flange portions for interlocking with a tire carried by said wheel for preventing relative rotation of said wheel sections to release said stud members when said tire is inflated, said stud members being circumferentially arranged and said slots being both circumferentially arranged and circumferentially elongated to insure alignment of said wheel sections, said stud members and slots forming the sole connections between said first and second wheel sections.

References Cited in the file of this patent

UNITED STATES PATENTS

| | | |
|---|---|---|
| 1,473,810 | Cambridge | Nov. 13, 1923 |
| 1,566,028 | Macklin | Dec. 15, 1925 |
| 2,192,064 | Pettinati | Feb. 27, 1940 |
| 2,345,993 | Sinclair | Apr. 4, 1944 |

FOREIGN PATENTS

| | | |
|---|---|---|
| 463,790 | Italy | May 31, 1951 |